US009021157B2

(12) United States Patent
Cox et al.

(10) Patent No.: US 9,021,157 B2
(45) Date of Patent: Apr. 28, 2015

(54) RELIABLE SOCKET TRANSFER BASED ON INITIALIZING AND RE-INITIALIZING A COMMUNICATION LINK AND RETAINING A CONNECTED STATE

(71) Applicant: Microsoft Corporation, Redmond, WA (US)

(72) Inventors: Matthew R. Cox, Kirkland, WA (US); Ivan D. Pashov, Woodinville, WA (US); Jonathan A. Silvera, Seattle, WA (US); Paul Sliwowicz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/852,904

(22) Filed: Mar. 28, 2013

(65) Prior Publication Data

US 2014/0297903 A1 Oct. 2, 2014

(51) Int. Cl.
*G06F 13/38* (2006.01)
*G06F 15/16* (2006.01)
*H04L 29/08* (2006.01)
*H04L 29/06* (2006.01)

(52) U.S. Cl.
CPC .......... *G06F 13/38* (2013.01); *H04L 29/08045* (2013.01); *H04L 69/162* (2013.01)

(58) Field of Classification Search
USPC ...................................... 710/14–19; 370/392
See application file for complete search history.

(56) References Cited

U.S. PATENT DOCUMENTS

| 5,680,615 | A | 10/1997 | Marlin et al. |
| 6,247,068 | B1 | 6/2001 | Kyle |
| 6,711,621 | B1 | 3/2004 | Mitra et al. |
| 6,920,501 | B2 | 7/2005 | Chu et al. |
| 7,225,260 | B2 | 5/2007 | Herrod |
| 7,320,029 | B2 | 1/2008 | Rinne et al. |
| 7,600,217 | B2 | 10/2009 | Dostert et al. |
| 7,706,895 | B2 | 4/2010 | Callaghan |
| 8,286,197 | B2 * | 10/2012 | Sng ............................... 719/328 |

(Continued)

FOREIGN PATENT DOCUMENTS

| EP | 1560397 | * | 3/2005 | ............. H04L 29/06 |
| EP | 2124397 A1 | | 11/2009 | |
| WO | 00/33189 A1 | | 6/2000 | |

OTHER PUBLICATIONS

"International Search Report & Written Opinion for PCT Patent Application No. PCT/US2013/059331", Mailed Date: Dec. 2, 2013, Filed Date: Sep. 12, 2013, 9 Pages.

*Primary Examiner* — Tammara Peyton
(74) *Attorney, Agent, or Firm* — John Jardine; Kate Drakos; Micky Minhas (57) ABSTRACT

Various embodiments initialize a communication link associated with data transfer to a connected state between participants in the communication link. In some cases, the communication link is paired with a first Input/Output (I/O) completion port effective to enable the data transfer. Some embodiments disassociate the communication link with the first I/O completion port and re-initialize the communication link while retaining the connected state. Alternately or additionally, the communication link is paired with at least a second I/O completion port. In some cases, the second I/O completion port utilizes an I/O model that differs from an I/O model associated with the first I/O completion port. Alternately or additionally, the communication link can be reconfigured to follow a IO model that does not utilize an IO completion port at all.

20 Claims, 7 Drawing Sheets

(56) References Cited

U.S. PATENT DOCUMENTS

| | | | |
|---|---|---|---|
| 8,706,889 B2 * | 4/2014 | Marquardt et al. | 709/228 |
| 2005/0101179 A1 | 5/2005 | Kim | |
| 2009/0201931 A1 * | 8/2009 | Xia et al. | 370/392 |
| 2011/0153834 A1 | 6/2011 | Bharrat | |

* cited by examiner

RELIABLE SOCKET TRANSFER BASED ON INITIALIZING AND RE-INITIALIZING A COMMUNICATION LINK AND RETAINING A CONNECTED STATE

BACKGROUND

Technology today enables computing devices to connect with one another and transfer data back and forth. For example, an application on a first computing device can communicate with an application on a second computing device using varying forms of communication links, such as a Berkley socket connection. At times, these data transfers can be asynchronous in nature, which, in turn, can cause less efficient processing on the computing device. To address this, some computing devices employ Input/Output (IO) completion ports that can be directly coupled to one or more communication links and further manage data transfer associated with the communication link(s). While an IO completion port can be used to process communications faster and load a central processing unit (CPU) more effectively, the direct coupling between the IO completion port and the communication link(s) can sometimes further couple the communication link(s) and IO completion port to a same IO model, thus making the communication link(s) less transferable to other applications.

SUMMARY

This Summary is provided to introduce a selection of concepts in a simplified form that are further described below in the Detailed Description. This Summary is not intended to identify key features or essential features of the claimed subject matter.

Various embodiments initialize a communication link associated with data transfer to a connected state between participants associated with the communication link. In some cases, the communication link is paired with a first Input/Output (IO) completion port effective to enable the data transfer. At a later point in time, some embodiments disassociate the communication link with the first IO completion port and re-initialize the communication link while retaining the connected state. Alternately or additionally, the communication link is paired with at least a second IO completion port. In some cases, the second IO completion port utilizes an IO model that differs from an IO model associated with the first IO completion port. Alternately or additionally, the communication link can be reconfigured to follow a IO model that does not utilize an IO completion port at all.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments initialize a communication link associated with data transfer to a connected state between participants associated with the communication link. In some cases, the communication link is paired with a first Input/Output (IO) completion port effective to enable the data transfer. For example, communication links having asynchronous data transfer can utilize an IO completion port as a more efficient way of handling the asynchronous nature of incoming and/or outgoing data. At times, it may be desirable to reuse the connection link with a different IO completion port and/or IO model, while still retaining the connection with the associated participants. Some embodiments disassociate the communication link with the first IO completion port and re-initialize the communication link to an initial state that retains the connected state with the associated participants. In some cases, the re-initialized communication link can be transferred for use by a new application and/or participant. Alternately or additionally, the communication link can be paired with at least a second IO completion port. In some cases, the second IO completion port utilizes an IO model that differs from an IO model associated with the first IO completion port. Alternately or additionally, after being re-initialized, the communication link can be reconfigured to utilize a different IO model and not utilize an IO completion port at all.

In the discussion that follows, a section entitled "Example Operating Environment" is provided and describes one environment in which one or more embodiments can be employed. Following this, a section entitled "Reliable Socket Transfer" describes transferring connected communication links in accordance with one or more embodiments. Last, a section entitled "Example Device" describes an example device that can be utilized to implement one or more embodiments Having provided an overview of various embodiments that are to be described below, consider now an example implementation in accordance with one or more embodiments.

Example Operating Environment

Figure 1:
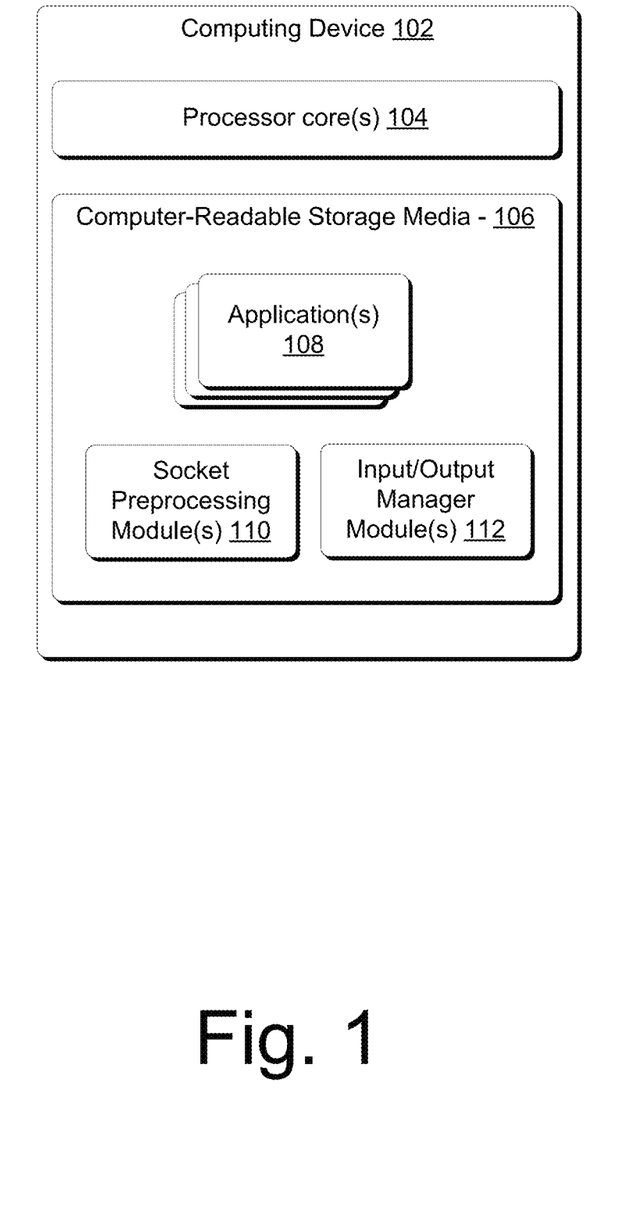
FIG. 1 is an illustration of an example computing device in accordance with one or more embodiments.

FIG. 1 is an illustration of an example computing device that is operable to employ the techniques described in this document. The illustrated example includes computing device 102 that may be configured in a variety of ways. For example, computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth. Thus, computing device 102 may range from full resource devices with substantial memory and processor resources (e.g., personal computers, game consoles) to a low-resource device with limited memory and/or processing resources (e.g., traditional set-top boxes, handheld game consoles). Computing device 102 also includes software that causes computing device 102 to perform one or more operations as described below.

Among other things, computing device 102 includes processor core(s) 104. Processor core(s) 104 represents functionality that can execute machine-level processor instructions, such as branch, jump, add, subtract, move data, and so forth. Alternately or additionally, processor core(s) 104 is configured to execute processor instructions in parallel with the other processor cores associated with computing device 102. Thus, computing device 102 can range from a single processor computing device, to a multi-core/multi-processor computing device.

Computing device 102 also includes one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. Among other things, computer-readable storage media 106 includes one or more application(s) 108, socket preprocessing module(s) 110, and one or more input/output module(s) 112.

Application(s) 108 represent one or more applications comprising instructions that can be executed by processor core(s) 104. Application(s) 108 can include high level application(s) with functionality to interact with a user of computing device 102, can include processor core instructions associated with a software thread, and/or can include instructions associated with low level application(s) that interact with low-level and/or rudimentary aspects of computing device 102, such as driver software, interrupt service routines, and so forth. Alternately or additionally, application(s) 108 can include functionality associated with an operating system. Thus, computing device 102 can include a wide range of application(s).

Socket preprocessing module(s) 110 represents functionality associated with network communication protocols and/or data transfer. Among other things, socket preprocessing module(s) 110 can expose networking and/or communication access to application(s) 108, such as through the use of Application Programming Interfaces (APIs). One such example would include Microsoft's Windows® Internet (WININET) software module. Any suitable type of network communication protocol can be utilized and/or exposed, such as HyperText Transfer Protocol (HTTP), File Transfer Protocol (FTP), and so forth. In some cases, socket preprocessing module(s) 110 exposes these protocols using high-level interfaces that abstract handshaking employed by the protocols to connect participants and/or transfer data. Alternately or additionally, socket preprocessing module(s) 110 can include functionality to configure a communications link according to one or more IO models, such as configuring a communication link as having asynchronous data transfer, as being a blocking communication link, as being a non-blocking communication link, as having overlapped I/O functionality, and so forth. Socket preprocessing module(s) 110 can also be configured to create, return, and manage handles associated with communication links, such as handles to sockets, files, etc. Thus, among other things, socket preprocessing module(s) includes functionality related to configuring and/or managing communication links and associated protocols.

Input/Output (IO) manager module(s) 112 represents functionality that, among other things, bridges a connection between functionality requested by and/or directed to socket preprocessing module(s) 110 and interfaces into hardware that can assist in executing IO functionality requested by and/or directed to socket processing module(s) 110 (and/or computing device 102 in general). Among other things, IO manager module(s) 112 abstracts methods for issuing and/or completing IO associated with asynchronous operation. For example, if socket preprocessing module(s) 110 requests to transfer data external to computing device 102, IO manager module(s) 112 can receive the request for data transfer and interface with associated device drivers that are utilized to transfer the data externally. As another example, if a data transfer requests to store data into a file located on an associated hard drive, IO manager module(s) 112 can manage access into, and out of, modules and/or software that facilitate this request. Alternately or additionally, IO manager module(s) 112 can oversee and/or manage hardware shared by multiple applications, ports, etc. For instance, in some cases, an IO completion port can be associated with multiple applications that share common hardware for data transfer. Among other things, IO manager module(s) 112 can manage the creation of the IO completion port, as well as what application(s) may be associated with the IO completion port.

Figure 2:
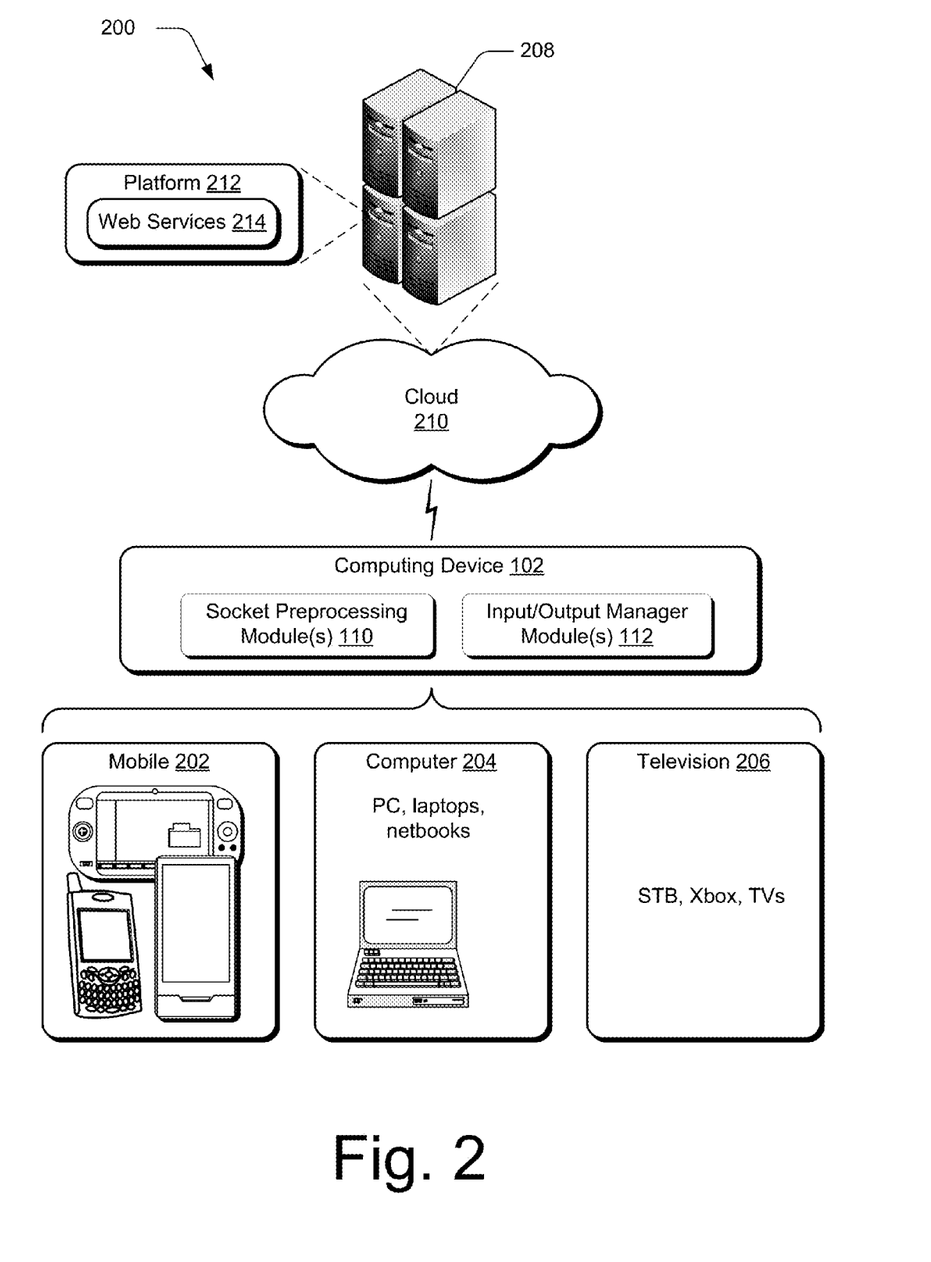
FIG. 2 is an illustration of an example operating environment in accordance with one or more embodiments.

FIG. 2 illustrates an example system 200 generally showing computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described, computing device 102 may be configured in a variety of different ways, such as for mobile 202, computer 204, and television 206 uses. Each of these configurations has a generally corresponding screen size and thus computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

In some embodiments, server(s) 208 include "cloud" functionality. Here, cloud 210 is illustrated as including a platform 212 for web services 214. The platform 212 abstracts underlying functionality of hardware (e.g., servers) and software resources of the cloud 210 and thus may act as a "cloud operating system." For example, the platform 212 may abstract resources to connect the computing device 102 with other computing devices. The platform 212 may also serve to abstract scaling of resources to provide a corresponding level of scale to encountered demand for the web services 214 that are implemented via the platform 212. A variety of other examples are also contemplated, such as load balancing of servers in a server farm, protection against malicious parties (e.g., spam, viruses, and other malware), and so on. Thus, the cloud 210 is included as a part of the strategy that pertains to software and hardware resources that are made available to the computing device 102 via the Internet or other networks.

Alternately or additionally, computing device 102 includes socket preprocessing module(s) 110 and IO manager module(s) 112 as described above and below. Here, computing device 102 is illustrated as using functionality provided by cloud 210 through connectivity associated with sockets preprocessing module(s) 110 and/or I/O manager module(s) 112.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Having described example operating environments in which various embodiments can be utilized, consider now a discussion of reliable socket transfer in accordance with one or more embodiments.

Reliable Socket Transfer

Most applications utilize some form of data transfer. In some cases, the data transfer remains local to a computing device and/or a memory device. In other cases, the data transfer expands beyond a computing device to external computing devices and/or memory locations. Varying types of communication links can aid in this data transfer, whether internal to a computing device or external. As one example, a Berkeley socket utilizes a standardized library of function calls implemented by each endpoint involved in a communication link. When a first endpoint desires to communicate with a second endpoint, the first endpoint can call into API's provided by the standardized library. Assuming each endpoint implements an interface and/or protocol that each endpoint understands, the communication link can then be established.

Different applications may desire different configurations of an associated communication link. For example, a first application may design around data transfer through a first socket configured to block execution of the application while waiting for data to be returned in response to a request. A second application might design around data transfer through a second socket that sends a request for data, but does not block execution of the application while waiting for a response. Instead, the second socket may be configured to periodically poll for returning data, but do additional processing in-between polls. Thus, different applications may desire sockets and/or communication links configured with different Input/Output (I/O) models based upon what is trying to be achieved.

Some computing devices have a capability to run several applications simultaneously. Further, some or all of the applications can be configured to establish and/or use a communication link to transfer data. While a computing device can be configured to run several applications using communication link(s) simultaneously, the computing device may have less hardware than requesting applications to perform data transfer. In these situations, the computing device may have additional IO management and/or capabilities to help make the data transfer and/or hardware resource management more efficient. For example, some computing devices may implement IO manager functionality, such as through operating system components, one or more applications, and/or an IO subsystem, that works in conjunction with an IO completion port as one method of managing data transfer over shared hardware between multiple applications, as further described below.

In addition to facilitating data transfer, some communication links can have extra properties. For instance, some participants and/or endpoints may request authentication of an associated communication link prior to allowing data transfer over the communication link. However, the authentication procedures typically add additional protocols and/or handshaking that applications using the communication link are either unaware of, or a designer of the application does not want to couple into the application in an effort to keep the application more generic. To aid these applications, some embodiments add communication link authentication procedures to operating system code and/or generic libraries that are indirectly called by the applications. These communication links can then be initialized, connected, and/or authenticated using the operating system code and/or generic libraries, and subsequently passed to a recipient application for further use.

Various embodiments initialize a communication link associated with data transfer to a connected state between participants in the communication link. In some cases, the communication link is paired with a first IO completion port effective to enable the data transfer. Some embodiments disassociate the communication link with the first IO completion port and re-initialize the communication link to an initial state that retains the connected state between the participants. In some cases, the re-initialized communication link can be transferred for use by a new application. For instance, consider FIG. 3, which illustrates an example environment 300 depicting a socket communication link being paired with an IO completion port.

Figure 3:
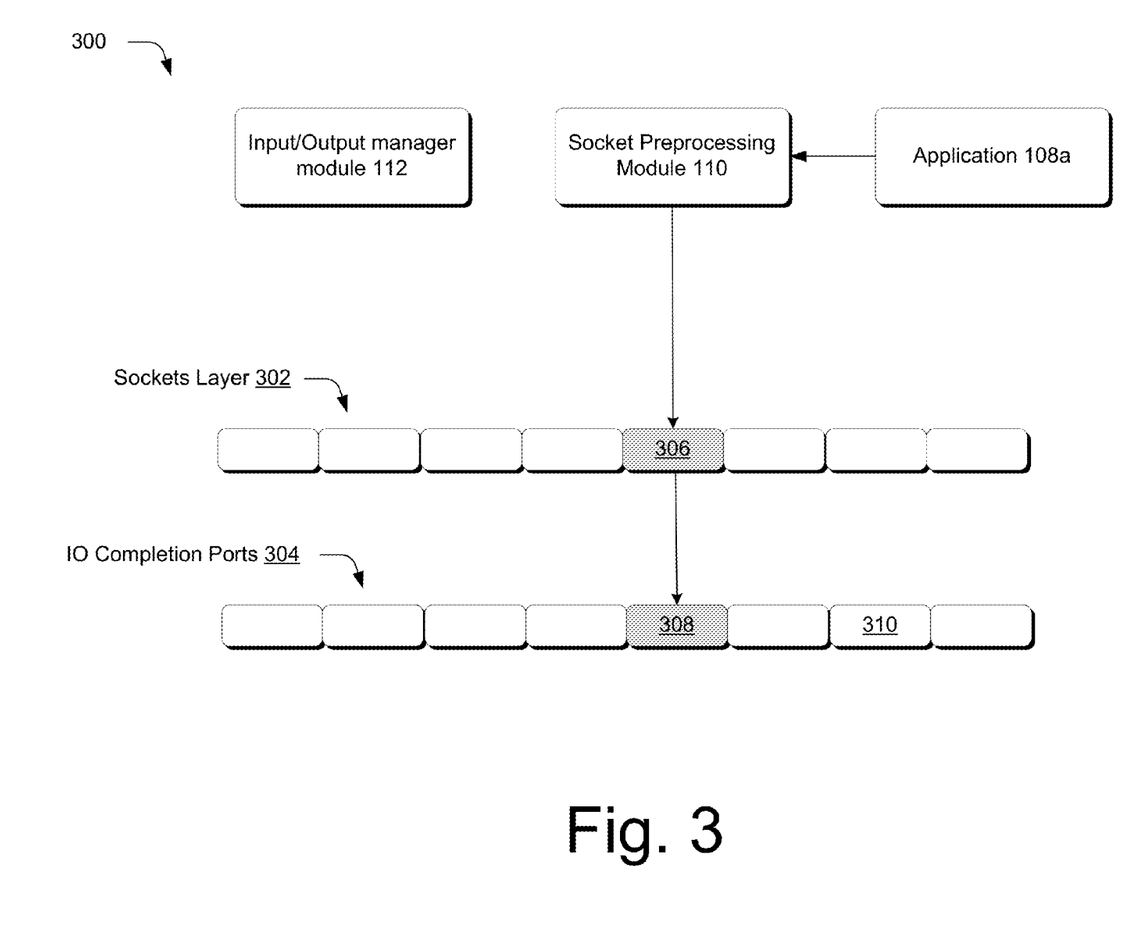
FIG. 3 is an illustration of an example environment containing an example implementation of a communication link in accordance with one or more embodiments

Included in environment 300 are application 108a, socket preprocessing module 110, and IO manager module 112 of FIG. 1. As discussed above, application 108a represents any suitable type of application, such as an operating system component, a user application, a library component, and so forth. For simplicity's sake, the term "application" here is used to represent a logical grouping of executable code configured to perform certain functionality. In some cases, this grouping of executable code can imply a "stand-alone" application that can run independently. Alternately or additionally, this grouping of code can imply callable library and/or operating system functions. Thus, "application" is meant to imply a broad range of functionality in varying forms of accessibility. Also included an environment 300 are socket layer 302, which illustrates a plurality of the sockets contained within environment 300, and IO completion ports 304, which additionally illustrate a plurality of IO completion ports. In this example, application 108a communicates with socket preprocessing module 110 as a way to initialize and/or access a communication link. For example, in some embodiments, application 108a calls APIs associated with socket processing module 110, as described above. Here, socket preprocessing module 110 establishes socket 306 contained within socket layer 302. The grey shading of socket 306 is used to convey that socket 306 is initialized, connected to an endpoint and/or associated participant, and paired with individual IO completion port 308 of IO completion ports 304. In similar fashion, IO completion port 308 contains grey shading to convey its pairing with socket 306. It is further noted that in this example, individual IO completion port 310, which is also included in IO completion ports 304, is not connected and/or paired with socket 306, subsequently indicated by the lack of grey shading.

A socket can be tied to an IO completion port in any suitable fashion. For example, in some embodiments, a socket can be represented by a socket handle. The socket handle, among other things, can be used as a way to manage the socket and enable programmatic access to the socket. In some cases, socket handles have associated functions that can be called to enable data transfer through the associated socket. Alternately or additionally, a socket handle can be used as an identifier and/or pointer to the associated socket. To tie an IO completion port to a socket, some embodiments pass the socket handle to the IO completion port. In turn, the IO completion port can maintain a list of socket handles that represent each socket for which the IO completion port is responsible and/or the socket handle can maintain a pointer to the IO completion port. Alternately or additionally, the socket handle and the IO completion port can be passed together to IO manager module 112. By tying a socket to an IO completion port, the IO completion port assumes some responsibility of monitoring data transfer for the socket, and offloading tasks for the socket as appropriate. For instance, in some embodiments, an IO completion port can receive notification of incoming data and enable retrieval of the data in any suitable manner, such as offloading retrieval of the data to a waiting task, notifying an associated application of the incoming data.

In some embodiments, associating a socket and/or socket handle to an IO completion port configures the socket to utilize a particular IO model. For instance, in this IO model, when a socket handle is associated with a completion port, the operating system marks an associated file object of the socket handle in such a manner that any future IO sent using the handle is associated with the completion port. However, it is to be appreciated that the socket can be associated with other IO models that do not use IO completion ports. For example, some IO models instead use APIs associated with a Berkley socket for event notification. Using an IO completion port can at times be beneficial. For example, by having a socket bound to an associated IO completion port, data transfer can be made more efficient. For instance, using an IO completion port model can allow a caller of the socket to get callbacks a system thread pool when data is available on the socket. However, this can also make the socket/socket handle more specific and less universal to other applications. For example, consider a case similar to that described above, where a communication link is routed through a proxy that requests authentication. One way to achieve authentication properly can include having an application have knowledge of the authentication procedure. However, as discussed above, this can undesirably couple the application to the proxy and/or the communication link.

In some embodiments, the authentication procedure can be decoupled from the application. As described above and further described below, a communication link can be initialized and/or connected between participants. This can include performing authentication procedures, and/or associating the communication link with a first IO completion port that is associated with a first IO model. Upon completing the initialization and/or authentication procedures, some embodiments can reset and/or reinitialize the communication link to an initial state while retaining a connected state between the associated participants. Some embodiments then transfer the reset and/or reinitialized communication link to a second application and/or second IO completion port. Alternately or additionally, the reset and/or reinitialized communication link can be reset to a state that enables the communication link to be associated with at least a second I/O model.

Figure 4:
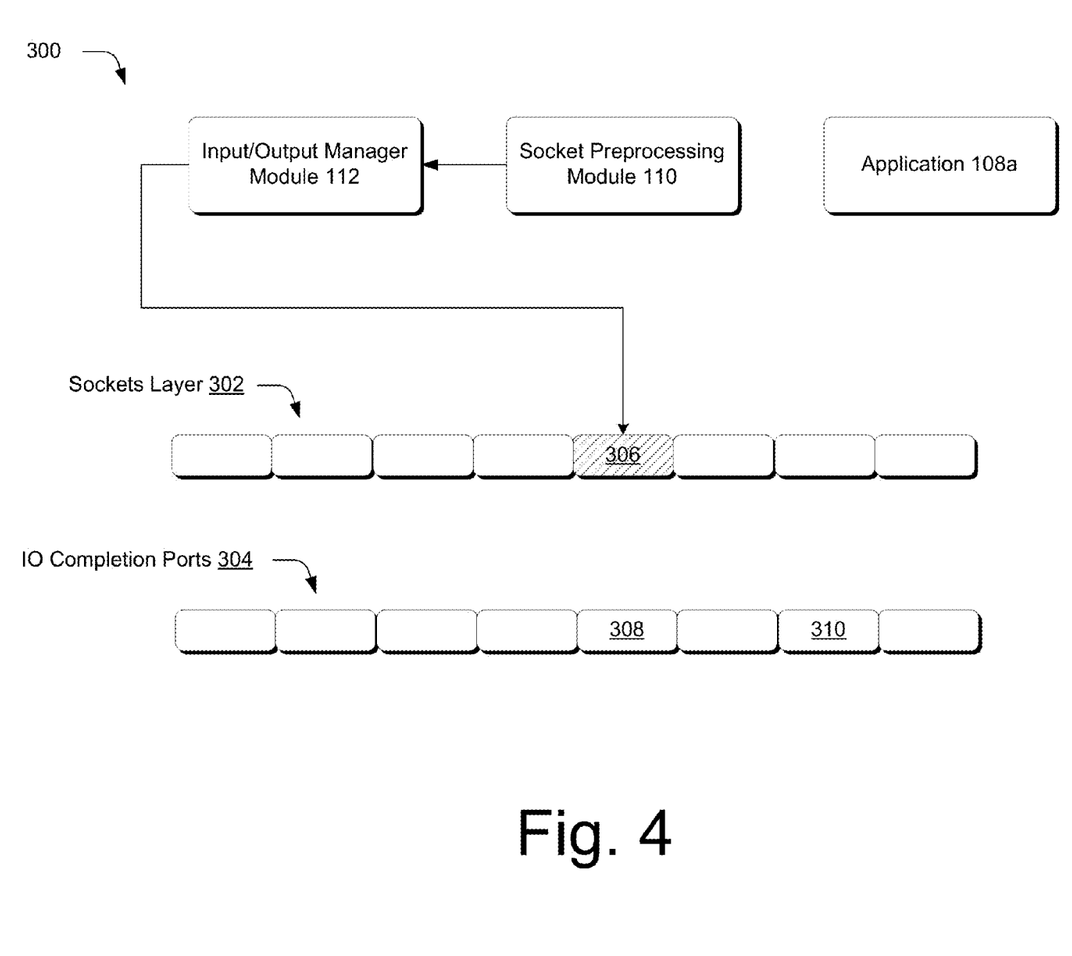
FIG. 4 is an illustration of an example environment containing an example implementation of a communication link in accordance with one or more embodiments.

Consider FIG. 4, which illustrates another embodiment of previously described example environment 300 of FIG. 3. As previously discussed, a communication link has been established via socket 306 and associated IO completion port 308. In some cases, the initializing and/or establishing can include performing any suitable type of authentication procedure associated with the link. Such type of authentication procedures can be managed in any suitable manner. In some embodiments, these procedures can be managed via socket processing module 110. Alternately or additionally, the initializing and/or establishing can be performed based, at least in part, on using a first IO model. Here, after the communication link has been established, a decision has been made to disassociate socket 306 with IO completion port 308 while maintaining the connection between at least some participants. Disassociating socket 306 with IO completion port 308 can be achieved in any suitable manner. In some cases, a socket handle associated with socket 306 can be removed from a list managed by IO completion port 308. Alternately or additionally, any settings for the communication link that are associated with the first IO model used by IO completion port 308 can be reset and/or initialize to a default state.

To further illustrate, consider the above example of an application potentially being coupled to authentication procedures. Instead of coupling the authentication procedures within an application, some embodiments configure an application to request an established communication link that has already been through authentication procedures and/or processes. Among other things, this can decouple the application from including any knowledge related to authenticating the communication link. Here, socket preprocessing module 110 communicates to IO manager module 112 a desire to reset and/or reinitialize socket 306 while maintaining its connected state. In response to the communication(s), IO manager module 112 resets and/or reinitializes socket 306 to a generalized state, such as removing any IO completion port associations, resetting flags that drive notifications, and so forth. Thus, the generalized state may reset any suitable parameters associated with the first IO model. Alternately or additionally, re-initializing a communication link can dissolve any pairing and/or association with an existing IO port, such as the association between socket 306 and IO completion port 308. Here, socket 306 is shaded with a grey hash pattern to indicate a connected state, while IO completion port 308 is no longer shaded, to indicate it is no longer associated with socket 306. Thus, FIG. 4 illustrates that socket 306 is connected, but no longer associated with IO completion port 308.

Figure 5:
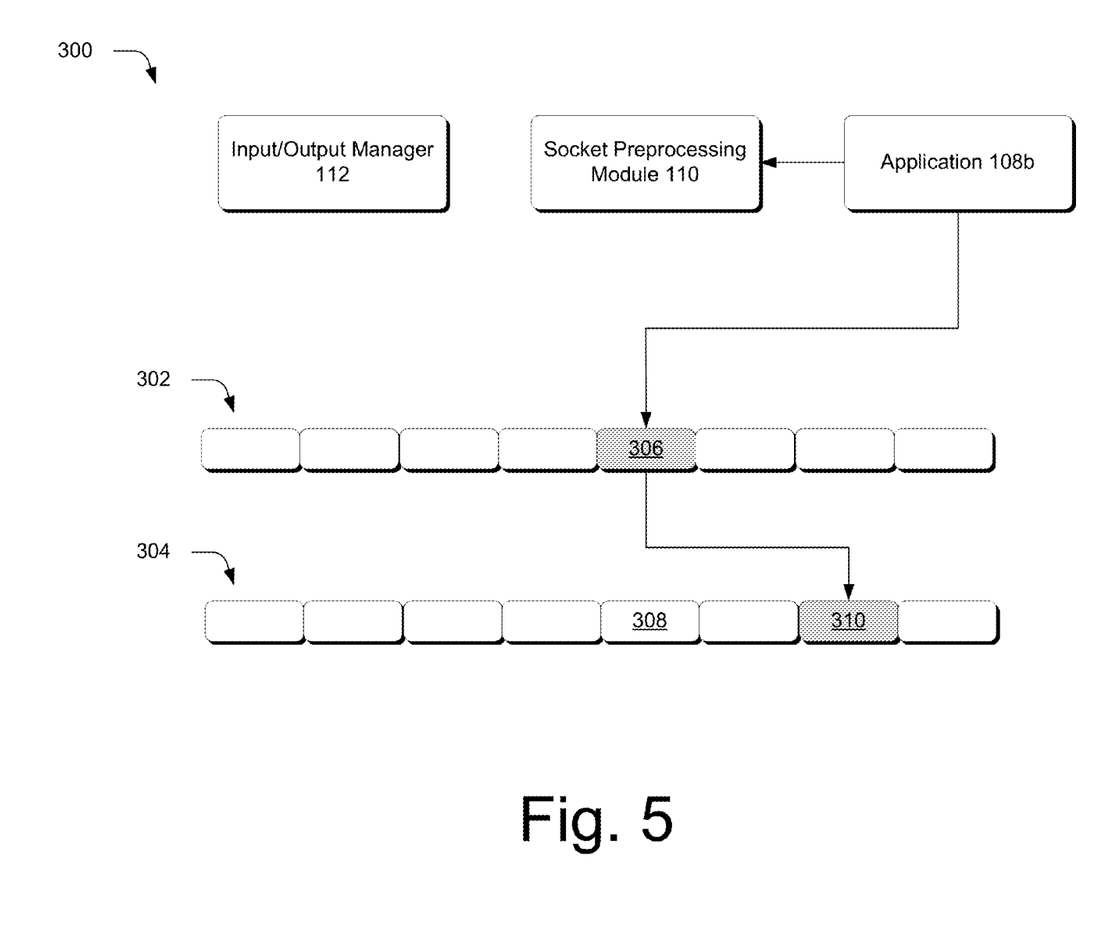
FIG. 5 is an illustration of an example environment containing an implementation of a communication link in accordance with one or more embodiments.

Continuing on, FIG. 5 illustrates another embodiment of previously described example environment 300 of FIG. 3. In FIG. 5, environment 300 includes a second application, noted here as application 108b to distinguish from application 108a of FIGS. 3 and 4. As in previous discussions, application 108b represents any suitable type of application, such as an operating system component, a user-driven application, a library component, and so forth. In this example, application 108b requests a connected and authenticated socket from socket preprocessing module 110. In turn, socket preprocessing module 110 transfers and/or reassigns socket 306 to application 108b for use. As part of this reassignment, socket 306 can sometimes be paired with a new IO completion port. For instance, application 108b may be configured to use a second IO model that differs from the first IO model employed to connect and/or authenticate socket 306. Further, the second IO model may be associated with a different IO completion port, such as IO completion port 308. Since socket 306 has been reinitialized to a more neutral, but connected state, application 108b can configure socket 306 according the second IO model. As part of this process, socket 306 can be paired with IO completion port 310, both of which are shaded grey to indicate their association. Since socket 306 has already been connected and/or initialized, application 108b simply uses the existing connection of already-authenticated socket 306. Thus, socket 306 was originally initialized utilizing a first IO model and first IO completion port, disassociated with the first IO completion port and/or first IO model, and transferred for use by an application utilizing a second IO model and/or paired with a second IO completion port.

Figure 6:
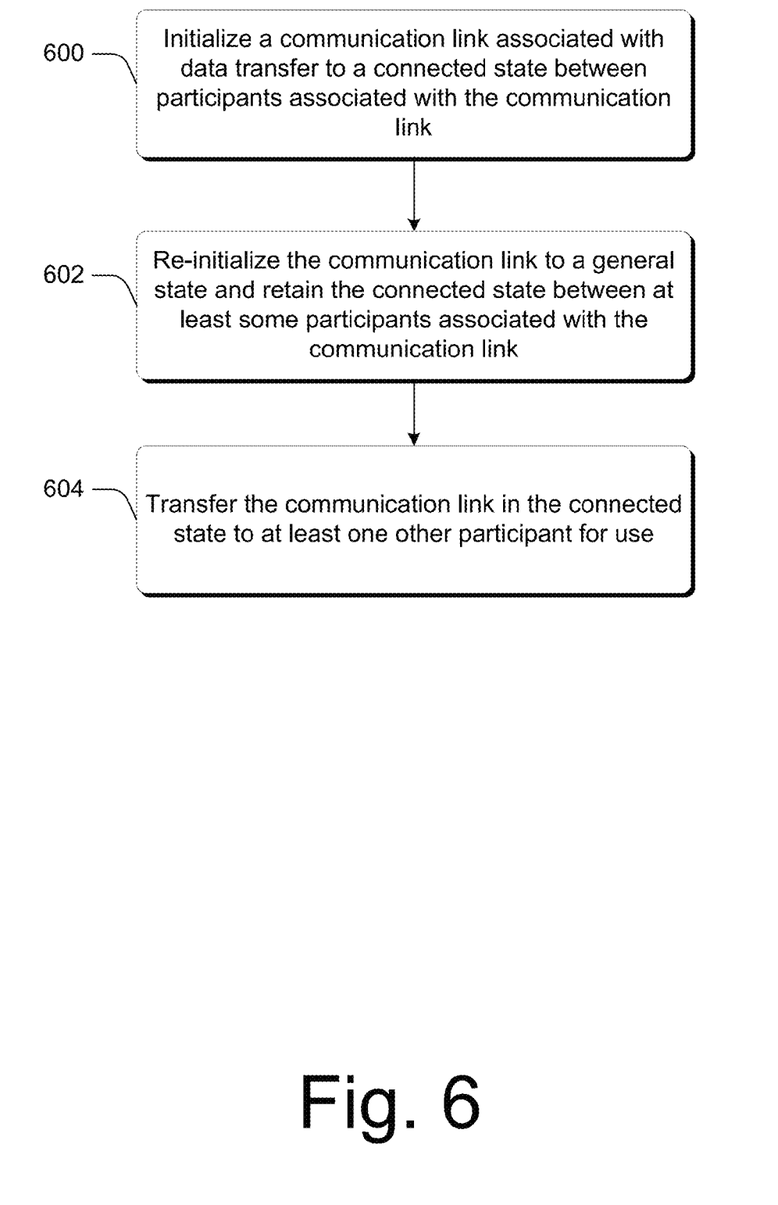
FIG. 6 illustrates a flow diagram in accordance with one or more embodiments.

To further illustrate, consider FIG. 6, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software modules executing on one or more computing device, such as socket preprocessing module 108, and/or IO manager module 110, of FIG. 1

Step 600 initializes a communication link associated with data transfer to a connected state between participants associated with the communication link. Any suitable type of communication link can be utilized, such as a socket, a file, and so forth. In some embodiments, the communication link can be associated with and/or characterized by a handle. As further discussed above, some sockets have an associated socket handle that enables programmatic access to the socket. Applications desiring access to the socket can do so by referencing the associated socket handle. Further, initializing the communication link can include any suitable type of functionality, such initializing options and/or parameters of the communication link that are associated with an IO model, associating the communication link with an IO completion port, performing authentication procedures, setting compression option(s), encryption option(s), security descriptor(s), impersonation option(s), network interface affinity, and so forth. Alternately or additionally, initializing the communication link to a connected state can place the communication link into position where it is ready to send or receive data transfer.

Step 602 re-initializes the communication link to a general state and retains the connected state between at least some participants associated with the communication link. In some cases, options and/or parameters associated with the communication link can be reset and/or initialized to a benign state, examples of which are provided above. For example, in some embodiments, re-initializing a socket communication link disassociates the socket with an IO completion port and/or resets parameters associated with configuring the socket to use a particular IO model. Some embodiments only reset options and/or parameters that do not affect the communication link's connected state.

Step 604 transfers the communication link in the connected state to at least one other participant for use. For example, as described above, an application can receive an established and/or authenticated communication link. In some embodiments, the communication link is then reconfigured to follow a different IO model than that used to establish the communication link. For instance, the communication link can be associated with a new IO completion port and/or have settings configured to follow a new IO model. Alternately or additionally, the communication link can be configured to be associated with the same IO completion port and/or IO model which was used to establish its associated connection.

Having considered a discussion of reliable socket transfer, consider now a discussion of an example device that can be utilized to implement the embodiments described above.

Example Device

Figure 7:
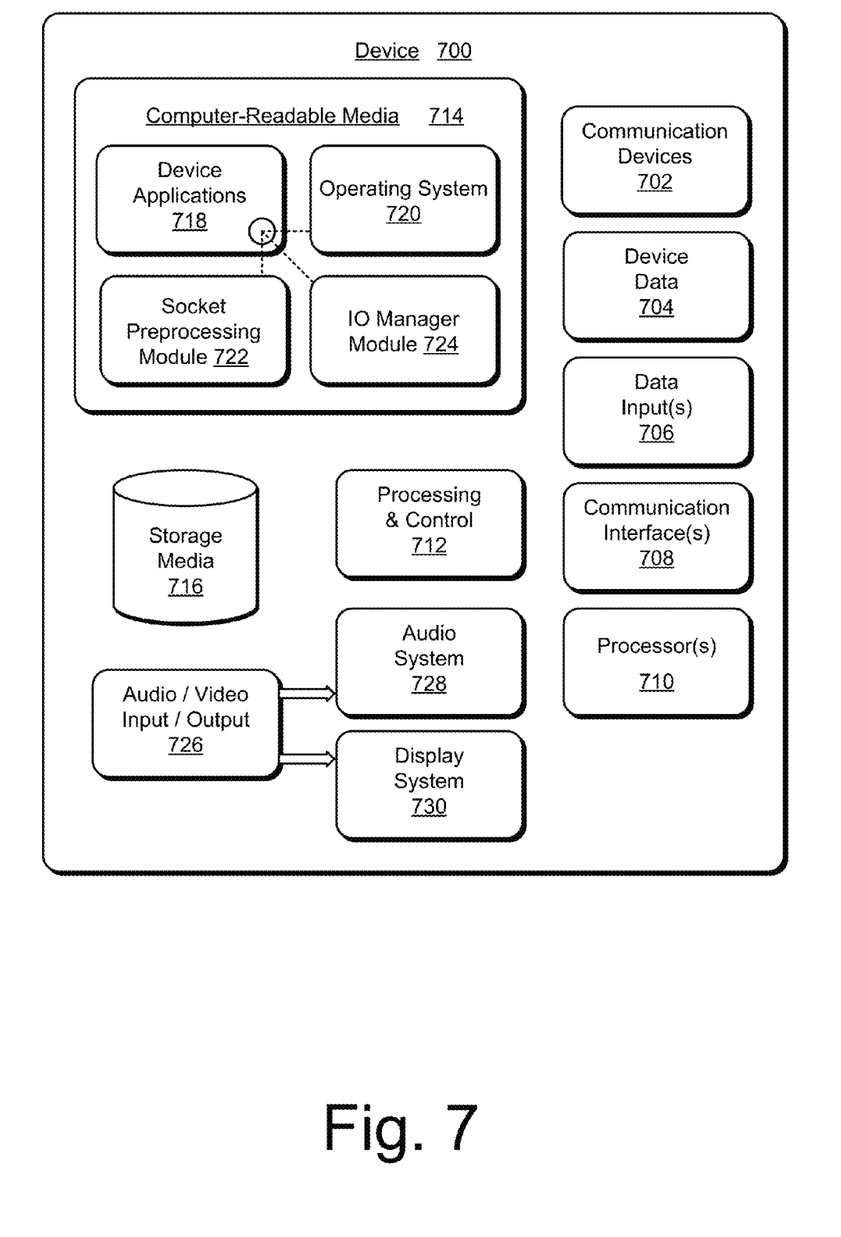
FIG. 7 illustrates an example computing device that can be utilized to implement various embodiments described herein.

FIG. 7 illustrates various components of an example device 700 that can be implemented as any type of portable and/or computer device as described with reference to FIGS. 1 and 2 to implement embodiments of reliable socket transfer described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 718 also include any system components or modules to implement embodiments of the techniques described herein. In this example, the device applications 718 include socket preprocessing module 722 and IO manager module 724 that are shown as software modules and/or computer applications. Socket preprocessing module 722 is representative of software that is used to enable access to data transfer communication mechanisms. Among other things, socket preprocessing module 722 can abstract protocols related to initializing and/or managing communication links, as described above. IO manager module 724 is representative of software that manages IO, such as IO requests related to socket preprocessing module 722, and further abstracts and/or generalizes methods of managing asynchronous IO. Alternatively or in addition, socket preprocessing module 722 and/or IO manager module 724 can be implemented as hardware, software, firmware, or any combination thereof.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Various embodiments initialize a communication link associated with data transfer to a connected state between participants in the communication link. In some cases, the communication link is paired with a first Input/Output (IO) completion port effective to enable the data transfer. Some embodiments disassociate the communication link with the first IO completion port and re-initialize the communication link while retaining the connected state. Alternately or additionally, the communication link is paired with at least a second IO completion port. In some cases, the second I/O completion port utilizes an IO model that differs from an IO model associated with the first IO completion port. Alternately or additionally, the communication link can be reconfigured to follow a IO model that does not utilize an IO completion port at all.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
    initializing a communication link associated with data transfer to a connected state between participants associated with the communication link at least by associating the communication link with a first Input/Output (IO) completion port;
    re-initializing the communication link to a general state and retaining the connected state between at least some participants associated with the communication link at least by disassociating the communication link with the first IO completion port; and
    transferring the communication link in the connected state to at least one other participant for use.

2. The computer-implemented method of claim 1, wherein initializing the communication link further comprises enabling authentication of the communication link.

3. The computer-implemented method of claim 1, wherein the communication link comprises a socket connection.

4. The computer-implemented method of claim 1 further comprising:
    responsive to transferring the communication link in the connected state to at least one other participant for use, associating the communication link with a second IO completion port.

5. The computer-implemented method of claim 1, wherein initializing the communication link further comprises initializing the communication link based, at least in part, on a first Input/Output (IO) model.

6. The computer-implemented method of claim 5 further comprising:
    responsive to transferring the communication link in the connected state to at least one other participant, configuring the communication link based, at least in part, on a second IO model.

7. One or more computer-readable storage memory embodying one or more processor-executable instructions which, responsive to execution by at least one processor, are configured to:
    initialize a communication link associated with data transfer to a connected state between participants associated with the communication link at least by associating the communication link with a first Input/Output (IO) completion port;
    re-initialize the communication link to a general state and retain the connected state between at least some participants associated with the communication link at least by disassociating the communication link with the first IO completion port; and
    transfer the communication link in the connected state to at least one other participant for use.

8. The one or more computer-readable storage memory of claim 7, wherein the instructions to initialize the communication link further comprise instructions to enable authentication of the communication link.

9. The one or more computer-readable storage memory of claim 7, wherein the communication link comprises a socket connection.

10. The one or more computer-readable storage memory of claim 7 further comprising instructions configured to:
    responsive to transferring the communication link in the connected state to at least one other participant for use, associate the communication link with a second IO completion port.

11. The one or more computer-readable storage memory of claim 7, wherein the instructions to initialize the communication link further comprise instructions to initialize the communication link based, at least in part, on a first Input/Output (IO) model.

12. The one or more computer-readable storage memory of claim 7 further comprising instructions configured to:
responsive to transferring the communication link in the connected state to at least one other participant, configure the communication link based, at least in part, on a second IO model.

13. A system comprising:
at least one processor; and
one or more computer-readable storage memory embodying one or more processor-executable instructions which, responsive to execution by the at least one processor, are configured to:
initialize a communication link associated with data transfer to a connected state between participants associated with the communication link at least by associating the communication link with a first Input/Output (IO) completion port;
re-initialize the communication link to a general state and retain the connected state between at least some participants associated with the communication link at least by disassociating the communication link with the first IO completion port; and
transfer the communication link in the connected state to at least one other participant for use.

14. The system of claim 13, wherein the instructions are further configured to:
responsive to transferring the communication link in the connected state to at least one other participant for use, associate the communication link with a second IO model.

15. The computer-implemented method of claim 1, wherein associating the communication link with the first Input/Output (IO) completion port further comprises utilizing a socket handle associated with the communication link.

16. The computer-implemented method of claim 1, wherein disassociating the communication link with the first IO completion port further comprises removing a socket handle associated with the communication link from a list managed by the first IO completion port.

17. The one or more computer-readable storage memory of claim 8, wherein the instructions to transfer the communication link in the connected state are further configured to transfer an authenticated communication link effective to enable the at least one other participant to use the authenticated communication link.

18. The one or more computer-readable storage memory of claim 7, wherein the instructions to initialize the communication link to a connected state further comprises instructions to initialize the communication link to a connected state that is ready to send or receive data transfer.

19. The system of claim 13, wherein the instructions are further configured to, responsive to transferring the communication link in the connected state to at least one other participant, configure the communication link based, at least in part, on a second IO model.

20. The system of claim 13, wherein the instructions to claim 9, wherein the instructions to initialize the communication link are further configured to authenticate the communication link as part of initialization of the communication link.

* * * * *